United States Patent [19]
Mori et al.

[11] Patent Number: 6,022,579
[45] Date of Patent: Feb. 8, 2000

[54] WATER-IN-OIL EMULSIFIED FAT COMPOSITION

[75] Inventors: Hideki Mori; Kenji Masui; Yukitaka Tanaka; Takuji Yasukawa, all of Ibaraki, Japan

[73] Assignee: Kao Corporation, Tokyo, Japan

[21] Appl. No.: 09/069,755

[22] Filed: Apr. 30, 1998

[51] Int. Cl.[7] ................................................ A23D 7/00
[52] U.S. Cl. .................................... 426/603; 426/607
[58] Field of Search ............................ 426/603, 601, 426/607

[56] References Cited

U.S. PATENT DOCUMENTS

| | | |
|---|---|---|
| 4,656,045 | 4/1987 | Bodor et al. . |
| 5,326,581 | 7/1994 | Higashioka ........................ 426/607 |
| 5,879,735 | 3/1999 | Cain ............................... 426/603 |

FOREIGN PATENT DOCUMENTS

| | | |
|---|---|---|
| 0 307 154 | 3/1989 | European Pat. Off. . |
| 0 417 562 | 3/1991 | European Pat. Off. . |
| 0 417 562 A1 | 3/1991 | European Pat. Off. . |
| 61-63242 | 4/1986 | Japan . |
| 63-301743 | 1/1988 | Japan . |
| 4-300826 | 10/1992 | Japan . |
| WO 95/22256 | 8/1995 | WIPO . |
| WO 95/22257 | 8/1995 | WIPO . |
| WO 96/32022 | 10/1996 | WIPO . |

OTHER PUBLICATIONS

Great Britain Chemical Abstract No. GB 8418154.

*Primary Examiner*—Carolyn Paden
*Attorney, Agent, or Firm*—Oblon, Spivak, McClelland, Maier & Neustadt, P.C.

[57] ABSTRACT

A W/O type emulsified fat composition is provided having an oily phase and an aqueous phase, wherein the oily phase contains 40 to less than 95% by weight of diglycerides and 5 to less than 60% by weight of triglycerides and satisfies the following requirements (1) and (2):

(1) the diglycerides have 0.5 to less than 20% by weight of SS components, 20 to less than 55% by weight of SU components, and 25 to less than 70% by weight of UU components (wherein S is a $C_{14-22}$ saturated fatty acid group and U is a $C_{14-22}$ unsaturated fatty acid group), and (2) the weight ratio of the $C_{14}$ and $C_{16}$ saturated fatty acid groups contained in the diglycerides to the $C_{18}$, $C_{20}$, and $C_{22}$ saturated fatty acid groups contained in the diglycerides is 1.0 to 8.0, and its use as a margarine or the like, having excellent stability and satisfactory spreadability.

11 Claims, No Drawings

6,022,579

WATER-IN-OIL EMULSIFIED FAT COMPOSITION

BACKGROUND OF THE INVENTION

1. Field of the Invention

The present invention relates to a water-in-oil (W/O) type emulsified fat composition containing specific diglycerides in a high concentration and suitable for use as a margarine, fat spread, etc.

2. Discussion of the Background

It is becoming clear that diglycerides have a function of being less likely to become body fat. See JP-A 4-300826. In order to ingest diglycerides in an effective amount through daily foods processed with fats, it is necessary to produce a fat-processed food containing diglycerides in a high concentration.

An example of a W/O type emulsified fat composition in which the oily phase contains diglycerides is disclosed in JP-A 63-301743. This reference shows a stable emulsion obtained by adding a solid fat to diglycerides which have a melting point of lower than 20° C., most of which are liquid at ordinary temperature. However, a margarine actually prepared according to this reference has the drawback that it has poor spreadability on a slice of bread.

On the other hand, JP-A 61-63242, corresponding to GB-A 8,418,154 and U.S. Pat. No. 4,656,045, describes a margarine containing diglycerides containing a fat which is solid at ordinary temperature. In this margarine, however, the diglyceride content in the oily phase is low, 5% to 30% and 10% to 20% of diglycerides in the oily phase impart a butter-like texture. EP-A 417,562 shows that the stability of a W/O type emulsion containing a phospholipid is improved by incorporating diglycerides into the oily phase.

However, those prior W/O type emulsified fat compositions, when formulated as margarines or the like, have poor stability and unsatisfactory spreadability.

SUMMARY OF THE INVENTION

Accordingly, one object of the present invention is to provide a W/O type emulsified fat composition in which the oily phase contains a high concentration of diglycerides containing a solid fat, and which is stable and has excellent spreadability.

This and other objects of the present invention have been satisfied by the discovery of a W/O type emulsified fat composition comprising an oily phase comprising from 40% by weight to less than 95% by weight of diglycerides and from 5% by weight to less than 60% by weight of triglycerides and satisfying the following requirements (1) and (2) and an aqueous phase comprising water as the base:

(1) the diglycerides comprise from 0.5% by weight to less than 20% by weight of SS components, from 20% by weight to less than 55% by weight of SU components, and from 25% by weight to less than 70% by weight of UU components, wherein S represents a $C_{4-22}$ saturated fatty acid group and U represents a $C_{4-22}$ unsaturated fatty acid group, and (2) a weight ratio of the $C_{14}$ and $C_{16}$ saturated fatty acid groups contained in the diglycerides to the $C_{18}$, $C_{20}$, and $C_{22}$ saturated fatty acid group contained in the diglycerides is from 1.0 to 8.0.

DETAILED DESCRIPTION OF THE PREFERRED EMBODIMENTS

The diglycerides for the oily phase of the W/O type emulsified fat composition of the present invention may be obtained from any fat or oil, including vegetable sources or animal sources as the feedstock. Examples thereof include rapeseed oil, sunflower oil, corn oil, soybean oil, rice oil, safflower oil, palm oil, coconut oil, and beef tallow. Fractionated products of these fats or oils and products having their melting point modified by hydrogenation, transesterification, etc. can be used also. In particular, a mixture of a hardened rapeseed oil and palm oil and a mixture of a hardened soybean oil and palm oil are preferred.

The oily phase of the W/O type emulsified fat composition of the present invention can be obtained by esterifying fatty acids (derived from any of the aforementioned fats and oils) with glycerol to give a fat having a high diglyceride content. This fat alone or a mixture thereof with any of the aforementioned feedstock fats and oils can be used as the oily phase, if necessary after an emulsifying agent is added thereto. The excess by-product monoglycerides can be removed by molecular distillation or chromatography. The esterification can be conducted by a chemical reaction using a conventional alkali catalyst, etc. It is preferably conducted enzymatically under mild conditions using, e.g., a lipase having 1,3-position selectivity, because the fat thus obtained is excellent in flavor and other characteristics.

The oily phase of the W/O type emulsified fat composition of the present invention comprises a fat composition containing diglycerides, effective in inhibiting body fat accumulation, in a high concentration. Specifically, the oily phase should have a diglyceride content of from 40 to less than 95% by weight and a triglyceride content of from 5 to less than 60% by weight and satisfy the following requirements (1) and (2):

(1) the diglycerides comprise from 0.5 to less than 20% by weight of SS components, from 20% to less than 55% by weight of SU components, and from 25% less to than 70% by weight of UU components, wherein S is a $C_{14-22}$ saturated fatty acid group and U is a $C_{14-22}$ unsaturated fatty acid group, and (2) a weight ratio of the $C_{14}$ and $C_{16}$ saturated fatty acid groups contained in the diglycerides to the $C_{18}$, $C_{20}$, and $C_{22}$ saturated fatty acid groups contained in the diglycerides is from 1.0 to 8.0.

The content of diglycerides in the oily phase is 40% by weight or higher, preferably 55% by weight or higher, more preferably 65% by weight or higher, from the standpoint of enriching the oily phase with diglycerides effective in inhibiting body fat accumulation.

In the fatty acid groups contained in the diglycerides, the content of unsaturated fatty acids is preferably from 55 to less than 93% by weight, more preferably from 55 to lower than 80% by weight, most preferably from 55 to lower than 70% by weight. If the content of unsaturated fatty acids is lower than 55% by weight, the W/O type composition has too high a melting point and gives a margarine having poor spreadability on bread, etc. and poor meltability in the mouth.

The diglycerides contained in the oily phase of the W/O type emulsified fat composition preferably comprise from 0.5 to less than 20% by weight of SS components, from 20% to less than 55% by weight of SU components, and from 25% to less than 70% by weight of UU components where the total of % SS+% SU+% U=100. The SS component, SU component, and UU component contents are more preferably from 2% to less than 16% by weight, from 25% to less than 50% by weight, and from 30% to less than 65% by weight, respectively, and still more preferably from 4% to less than 12% by weight, from 30% to less than 48% by weight, and from 35% to less than 60% by weight, respectively. If the SS component content exceeds 20% by weight, the W/O type composition has too high a melting point and is too hard. If the SU component content is lower than 20% by weight, SS component crystals separate out and a stable emulsion can be obtained only with great difficulty. SU component contents of higher than 55% by weight are undesirable in that the production of such an oily phase necessitates fractionation as an essential step and leads to increased cost. If the UU component content is higher than 70% by weight, a stable emulsion is also difficult to obtain.

In the diglycerides contained in the oily phase of the W/O type emulsified fat composition, the weight ratio of the $C_{14}$ and $C_{16}$ saturated fatty acid groups to the $C_{18}$, $C_{20}$, and $C_{22}$ saturated fatty acid groups is preferably 1.0 to 8.0, more preferably 2.0 to 7.0. The proportions of saturated fatty acid groups are especially important for the production of margarines containing diglycerides in a high concentration. In particular, saturated diglycerides, i.e., SS components, in which the two fatty acid residues are each saturated are likely to form β-crystals. In margarines, the SS components form crystalline nuclei to considerably influence the margarine properties. By controlling and limiting the ratio of, in particular, the $C_{14}$ and $C_{16}$ saturated fatty acid groups to the $C_{18}$, $C_{20}$, $C_{22}$ saturated fatty acid groups, effective margarines can be produced. If the above ratio is lower than 1.0, not only the compatibility in the oily phase decreases, resulting in poor emulsion stability, but also the obtained margarine gives a poor feeling in the mouth because of reduced meltability. If the above ratio exceeds 8.0, bulking crystallization proceeds and a satisfactory margarine texture is difficult to obtain.

The diglycerides contained in the oily phase of the W/O type emulsified fat composition have a melting point of preferably from 20 to lower than 50° C., more preferably higher than 30° C. but lower than 47° C. If diglycerides having a melting point lower than 20° C. are used, it is difficult to obtain a margarine having both moderate shape retention and spreadability in a good combination. If diglycerides having a melting point of 50° C. or above are used, the obtained margarine is too hard and has reduced spreadability.

The W/O type emulsified fat composition of the present invention may be produced by conventional methods. In emulsification, an aqueous phase comprising water as the base may be mixed with an oily phase at a weight ratio (aqueous phase/oily phase) of 10/90 to 70/30, preferably 20/80 to 60/40.

Auxiliary components for the aqueous or oily phase, such as dairy products, salts, sugars, flavoring agents, acids, seasonings, and emulsifying agents, can be incorporated, as desired, into the W/O type emulsified fat composition of the present invention. Examples of the emulsifying agents include emulsifiers suitable for foods, such as monoglycerides, sucrose/fatty acid esters, polyglycerol/fatty acid esters, sorbitan/fatty acid esters, and lecithins.

For inhibiting deterioration of the W/O type emulsified fat composition, an antioxidant such as a tocophenol, an ascorbic ester, or a natural antioxidizing ingredient may also be used. Examples of the ascorbic ester include palmitates and stearates. Examples of the natural antioxidizing ingredient include plant extracts obtained from leaves or roots of tea, and herbs such as rosemary, peach, etc.

EXAMPLES

Having generally described this invention, a further understanding can be obtained by reference to certain specific examples which are provided herein for purposes of illustration only and are not intended to be limiting unless otherwise specified. In the Examples, all percents and parts are by weight.

Examples 1 and 2 and Comparative Examples 1 and 2

Preparation of Diglycerides 3.5 kg of a hardened rapeseed oil (melting point: 31.5° C.) was mixed with 3.5 kg of distilled water and 5 g of a commercial lipase preparation (trade name, "Lipase OF"; manufactured by Meito Sangyo Co. Ltd.). The mixture was reacted, while stirring, at 36° C. for 5 hours. Thereafter, the reaction mixture was centrifuged, and fatty acids derived from rapeseed oil were obtained from the upper layer. Palm oil (melting point: 37.5° C.) was treated as a feedstock in the same manner as above to obtain fatty acids derived from palm oil. The composition of the fatty acids obtained from each oil is shown in Table 1.

Each of four mixtures of the fatty acids obtained above was mixed with glycerol at a molar ratio of about 2/1, and each resultant mixture was reacted at 50° C. at a reduced pressure, using as a catalyst a commercial lipase preparation (trade name, "Lipozyme 3A"; manufactured by Novo Industri A.S.) which is an immobilized lipase having 1,3-position selectivity. After the lipase preparation was filtered off, each of the finally obtained product mixtures was subjected to molecular distillation and purified in a conventional manner to obtain diglyceride mixtures A to D.

TABLE 1

|  | Hardened rapeseed oil (%) | Palm oil (%) |
|---|---|---|
| $C_{14:0}$ | — | 1.1 |
| $C_{16:0}$ | 3.8 | 44 |
| $C_{16:1}$ | 0.2 | 0.1 |
| $C_{18:0}$ | 12.0 | 4.5 |
| $C_{18:1}$ | 78.7 | 39.2 |
| $C_{18:2}$ | 0.2 | 10.1 |
| $C_{18:3}$ | — | 0.4 |
| $C_{20:0}$ | — | 0.4 |
| $C_{20:1}$ | 2.3 | — |

TABLE 2

| Diglyceride | Proportion of feedstock fatty acids (%) | | Fat composition (%) | | | Content of unsaturated fatty acids in DG | DG composition (%) | | | Fatty acid ratio in DG $(C_{14} + C_{16})/(C_{18} + C_{20} + C_{22})$ |
|---|---|---|---|---|---|---|---|---|---|---|
| | Fatty acids derived from hardened rapeseed oil | Fatty acids derived from palm oil | MG | DG | TG | | SS | SU | UU | |
| A | 100 | 0 | 1.1 | 88.1 | 10.8 | 81.5 | 3.1 | 30.9 | 66.9 | 0.3 |
| B | 60 | 40 | 0.9 | 86.8 | 12.3 | 68.8 | 9.9 | 43.2 | 46.9 | 2.2 |
| C | 25 | 75 | 1.0 | 85.3 | 13.7 | 57.7 | 18.1 | 48.8 | 33.1 | 5.2 |
| D | 0 | 100 | 1.0 | 87.5 | 11.5 | 49.8 | 25.5 | 49.8 | 24.7 | 9.2 |

40 parts of each of diglyceride mixtures A to D was melted by heating to prepare a homogeneous oily phase. Separately, 0.1 part of a butter flavor was dissolved in 59.9 parts of water to prepare an aqueous phase. Each oily phase was mixed with the aqueous phase to obtain an emulsion, which was sterilized and then rapidly cooled in a conventional manner to plasticize it. Thus, W/O type emulsified fat compositions were produced.

The W/O type emulsified fat compositions obtained through plasticization by rapid cooling were examined for emulsion stability at 5° C. and 20° C. (texture and aqueous-phase separation upon spreading) and for feeling in the mouth such as roughness and meltability.

The obtained results are shown in Table 3.

TABLE 3

| Diglyceride mixture used | Com. Ex. 1 A | Ex. 1 B | Ex. 2 C | Com. Ex. 2 D |
|---|---|---|---|---|
| (State just after production) | | | | |
| Texture | Δ | ○ | ○ | Δ |
| Aqueous-phase separation upon spreading | Δ~○ | ○ | ○ | Δ~X |
| (After storage at 5° C.) | | | | |
| Texture | Δ~X | ○ | ○ | Δ |
| Aqueous-phase separation upon spreading | Δ~○ | ○ | ○ | Δ~X |
| (After storage at 20° C.) | | | | |
| Texture | Δ~X | ○ | ○ | Δ |
| Aqueous-phase separation upon spreading | Δ | ○ | ○ | Δ~X |
| Evaluation for feeling in the mouth  Roughness | Δ | ○ | ○ | Δ |
| (After storage at 20° C.)  Meltability | Δ | ○ | ○ | Δ~X |

Note:
Criteria for evaluation for texture
○: smooth
Δ: slightly rough
X: rough
Criteria for evaluation of aqueous-phase separation upon spreading
○: no separation observed
Δ: slight separation observed
X: separation observed
Criteria for evaluation of feeling in the mouth
Roughness ○: smooth Δ: slightly rough X: rough
Meltability ○: good Δ: slightly poor X: poor Examples 3 and 4
Preparation of Diglycerides Soybean oil was treated as a feedstock in the same manner as in the above Examples to obtain fatty acids derived from soybean oil.

100 parts of the fatty acids derived from soybean oil were mixed with 200 parts of hexane at ordinary temperature. This mixture was cooled to −20° C. and maintained for 5 hours under gentle stirring, then filtered at −20° C. The resultant precipitate and filtrate were separately heated at 40° C. under reduced pressure to remove the solvent to thereby obtain two fatty acid mixtures.

Using the fatty acids recovered from the precipitates, diglyceride mixture E (melting point: 45.3° C.) was prepared in the same manner as in the above Examples. Separately, 40 parts of the fatty acids recovered from the filtrate were mixed with 60 parts of the fatty acids derived from palm oil prepared in the above Examples. Diglyceride mixture F was prepared from the resultant fatty acid mixture in the same manner as in the above Examples.

The composition of each fatty acid mixture is shown in Table 4.

The fat composition of each diglyceride mixture is shown in Table 5.

TABLE 4

| | Soybean oil (%) | Diglyceride E (%) | Diglyceride F (%) |
|---|---|---|---|
| $C_{14:0}$ | 0.1 | — | 0.1 |
| $C_{16:0}$ | 11.9 | 31.4 | 3.5 |
| $C_{18:0}$ | 4.2 | 13.1 | 1.1 |
| $C_{18:1}$ | 24.4 | 15.9 | 25.4 |
| $C_{18:2}$ | 51.4 | 35.9 | 60.3 |
| $C_{18:3}$ | 5.5 | 3.8 | 6.1 |

TABLE 5

| | Fat composition (%) | | | Content of un- saturated fatty acids | DG composition (%) | | | Fatty acid ratio in DG $(C_{14} + C_{16})/(C_{18} + C_{20} + C_{22})$ |
|---|---|---|---|---|---|---|---|---|
| | MG | DG | TG | in DG | SS | SU | UU | |
| E | 1.0 | 84.9 | 14.1 | 55.6 | 19.2 | 49.8 | 31.0 | 2.4 |
| F | 1.1 | 85.6 | 13.2 | 66.7 | 11.1 | 44.1 | 44.8 | 7.1 |

Each of diglyceride mixtures E and F was used as an oily phase to produce W/O type emulsified fat compositions in the same manner as in the above Examples, and the compositions were evaluated. Thus it was found that both compositions had an excellent emulsion stability and gave a satisfactory feeling in the mouth.

This application is based on Japanese Priority Application 10-51008, filed in the Japanese Patent Office on Mar. 3, 1998, the contents of which are hereby incorporated by reference.

Obviously, additional modifications and variations of the present invention are possible in light of the above teachings. It is therefore to be understood that within the scope of the appended claims, the invention may be practiced otherwise than as specifically described herein.

We claim:

1. A water-in-oil emulsified fat composition comprising an oily phase and an aqueous phase, wherein the oily phase comprises 40% by weight to less than 95% by weight of diglycerides and 5% by weight to less than 60% by weight of triglycerides and satisfies both of the following requirements (1) and (2):

(1) the diglycerides comprise 0.5% by weight to less than 20% by weight of SS components, 20% by weight to less than 55% by weight of SU components, and 25% by weight to less than 70% by weight of UU components, wherein S is a $C_{4-22}$ saturated fatty acid group and U is a $C_{14-22}$ unsaturated fatty acid group and the total of % SS+% SU+% UU=100, and (2) a weight ratio of total $C_{14}$ and $C_{16}$ saturated fatty acid groups contained in the diglycerides to total $C_{18}$, $C_{20}$, and $C_{22}$ saturated fatty acid groups contained in the diglycerides is in the range of from 1.0 to 8.0.

2. The water-in-oil emulsified fat composition as claimed in claim 1, wherein the diglycerides have a melting point of from 20 to lower than 50° C.

3. The water-in-oil emulsified fat composition as claimed in claim 1, wherein the diglycerides are obtained from a fat or oil selected from the group consisting of rapeseed oil, sunflower oil, corn oil, soybean oil, rice oil, safflower oil, palm oil, coconut oil, beef tallow, fractionated products thereof and mixtures thereof.

4. The water-in-oil emulsified fat composition as claimed in claim 1, wherein the diglycerides are obtained from a mixture of palm oil and a hardened oil selected from rapeseed oil and soybean oil.

5. The water-in-oil emulsified fat composition as claimed in claim 1, wherein the content of diglycerides in the oily phase is from 55 to 95% by weight.

6. The water-in-oil emulsified fat composition as claimed in claim 1, wherein the content of diglycerides in the oily phase is from 65 to 95% by weight.

7. The water-in-oil emulsified fat composition as claimed in claim 1, wherein unsaturated fatty acid groups are present in the diglycerides in an amount of from 55 to less than 93% by weight.

8. The water-in-oil emulsified fat composition as claimed in claim 1, wherein the diglycerides comprise 2% by weight to less than 16% by weight of SS components, 25% by weight to less than 50% by weight of SU components, and 30% by weight to less than 65% by weight of UU components.

9. The water-in-oil emulsified fat composition as claimed in claim 1, wherein the weight ratio of total $C_{14}$ and $C_{16}$ saturated fatty acid groups contained in the diglycerides to total $C_{18}$, $C_{20}$, and $C_{22}$ saturated fatty acid groups contained in the diglycerides is in the range of from 2.0 to 7.0.

10. The water-in-oil emulsified fat composition as claimed in claim 1, further comprising one or more auxiliary components selected from the group consisting of dairy products, salts, sugars, flavoring agents, acids, seasonings, antioxidants and emulsifying agents.

11. The water-in-oil emulsified fat composition as claimed in claim 10, wherein said emulsifying agents are selected from the group consisting of monoglycerides, sucrose/fatty acid esters, polyglycerol/fatty acid esters, sorbitan/fatty acid esters and lecithins.

* * * * *